May 5, 1942.   M. A. LAMBRIX   2,282,193

METHOD AND APPARATUS FOR CUTTING GEARS

Filed May 8, 1937   2 Sheets-Sheet 1

INVENTOR
*Maurice A. Lambrix*
BY
*Evans & McCoy*
ATTORNEYS

May 5, 1942. M. A. LAMBRIX 2,282,193
METHOD AND APPARATUS FOR CUTTING GEARS
Filed May 8, 1937 2 Sheets-Sheet 2
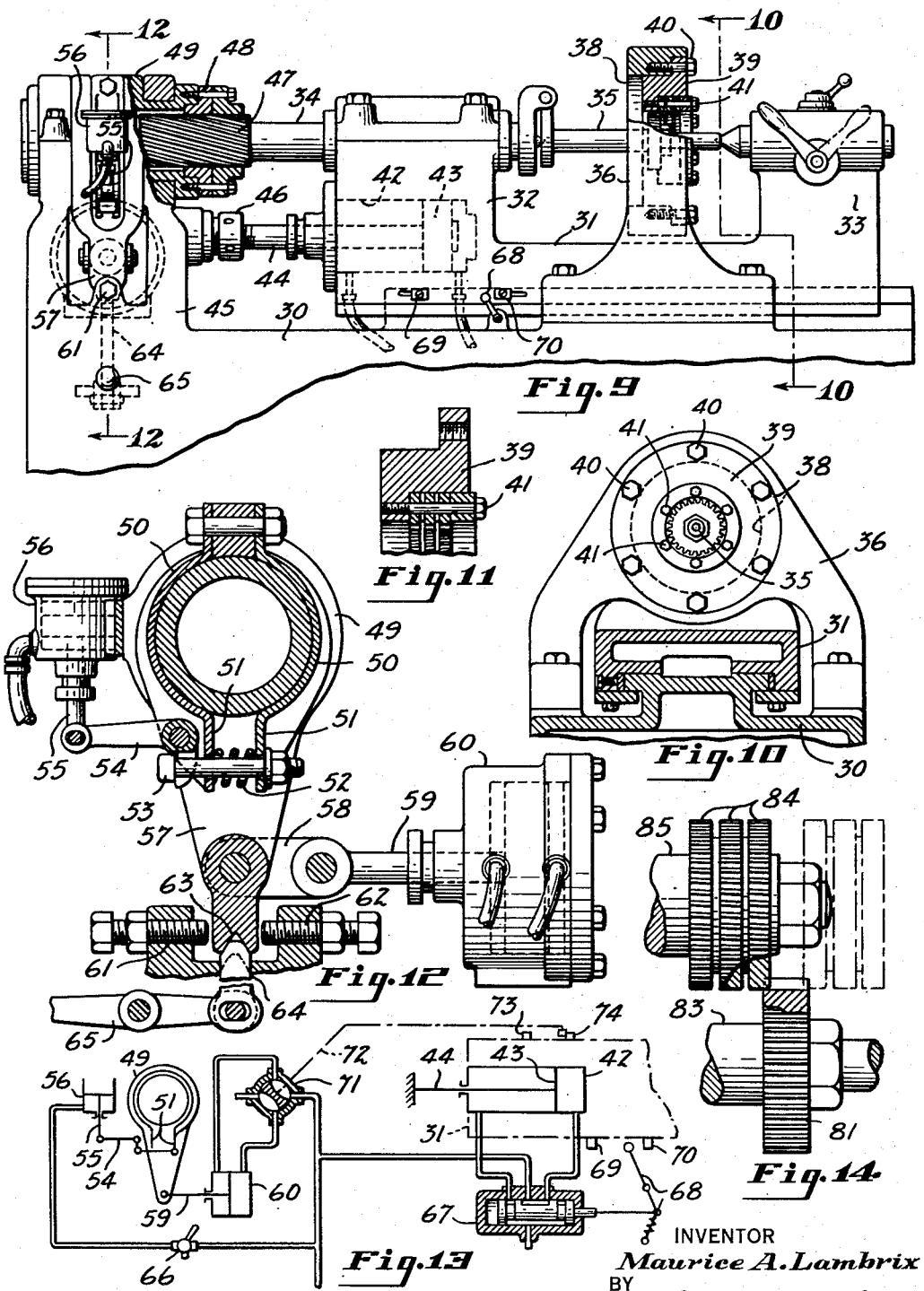
INVENTOR
Maurice A. Lambrix
BY
Evans + McCoy
ATTORNEYS Patented May 5, 1942

2,282,193

UNITED STATES PATENT OFFICE 2,282,193

METHOD AND APPARATUS FOR CUTTING GEARS

Maurice A. Lambrix, Cleveland, Ohio, assignor to Gear Processing, Inc., Cleveland, Ohio, a corporation of Ohio Application May 8, 1937, Serial No. 141,443

1 Claim.  (Cl. 90—10)

This invention relates to a method of and apparatus for cutting gears by which the tooth profiles of the gears are cut by means of gear shaped cutting elements which are reciprocated lengthwise of the tooth profiles being cut.

The present invention has for its object to provide a method of finishing gear teeth with a gear shaped profile forming tool intermeshing with the teeth of the gear and having a reciprocating stroke lengthwise of the gear teeth in which the teeth of the tool are caused to float between the teeth of the gear and engage the gear tooth faces with a yielding pressure and in which the extent of relative angular movement of the teeth in each direction is gauged to limit the action of each profile forming tooth to a space of predetermined width.

A further object of the invention is to provide a method of finishing gears by which the gear teeth may be accurately cut to a predetermined size and contour by means of cutters yieldingly pressed against the gear tooth faces, so that a gear driven cutter feed mechanism is unnecessary.

Further objects are to provide a method by which the cutting elements are continuously maintained in intermeshing engagement with the gear being cut during relative reciprocation so that the cutter may be positioned by the gear teeth and by which the correct width of the spaces between teeth and the correct thickness of the teeth in the finished gear is obtained by limiting the extent of relative angular movement of the interengaged teeth of the cutter and gear.

A further object of the invention is to provide a gear cutting machine suitable for practicing the process.

A further object is to provide a cutter and an assembly of cutters suitable for use in practicing the process.

With the above and other objects in view the invention may be said to comprise the method and apparatus as illustrated in the accompanying drawings hereinafter described and particularly set forth in the appended claim together with such variations and modifications thereof as will be apparent to one skilled in the art to which the invention appertains.

Reference should be had to the accompanying drawings forming a part of this specification, in which:

Fig. 9 is a side elevation of a gear cutting machine embodying the invention;

Fig. 10 is a section taken on the line indicated at 10—10 in Fig. 9;

Fig. 11 is a fragmentary section on an enlarged scale showing the ring shaped holder for an internal gear or for an assembly of cutters having the form of internal gears;

Fig. 12 is a detail view showing the fluid pressure operated devices for clamping the spindle and for applying a torsional thrust thereto;

Fig. 13 is a diagrammatic view showing the means for automatically controlling the spindle reciprocating and torsion applying cylinders;

Fig. 14 is a fragmentary view showing a modification of the invention in which the cutters have a generating cutting action upon a gear in running mesh therewith.

Figure 1:
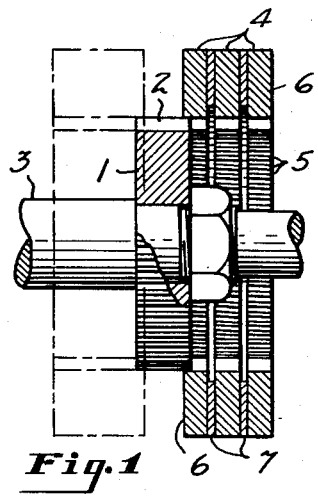
Figure 1 is an axial section showing a spur gear and an assembly of cutting elements in the form of internal gears intermeshed with the gear in coaxial relation for cutting the tooth profiles.
Figure 2:
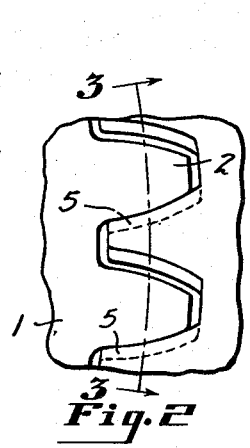
Fig. 2 is a fragmentary end view on an enlarged scale showing two of the gear teeth and an intermediate cutter tooth, the relative position of the teeth being that which the teeth have during movement of the cutters to the left in Fig. 1.
Figure 3:
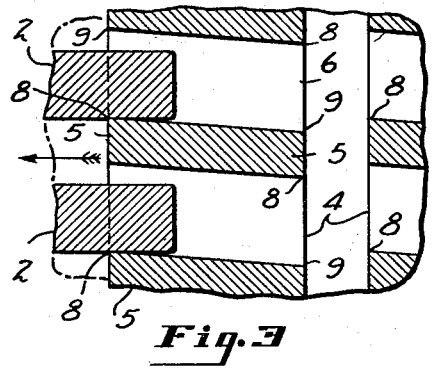
Fig. 3 is a fragmentary tangential section through engaging gear and cutter teeth showing the engagement of the acute angled cutting edge of the cutter teeth with faces of the gear teeth during movement of the cutters to the left in Fig. 1.

In Fig. 1 of the drawings a spur gear 1 having straight teeth 2 is shown mounted upon a spindle 3. A series of hardened tool steel cutters 4 which have the form of internal gears are shown mounted coaxial with the gear 1. The pitch diameter and tooth spacing of the cutters is the same as the pitch diameter of the gear.

and the gear teeth are received in the spaces between the cutter teeth. The cutter teeth 5 are helical teeth disposed at a small angle with respect to axial planes. The cutters 4 have flat side faces 6 and are secured together with relatively thin annular spacers 7 between them. As shown in Figs. 2 and 3 the cutter teeth 5 are narrower than the spaces between the gear teeth 2 so that the cutter teeth may pass through the spaces between the cutter teeth with cutting edges in engagement with gear teeth on one side only and without contacting the opposite faces of the gear teeth.

Figure 5:
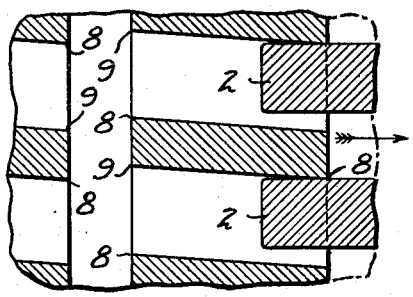
Fig. 5 is a tangential section similar to Fig. 3 showing the engagement of the cutter teeth with the opposite side faces of the gear during the return movement of the cutters.

As shown in Fig. 3 of the drawings the flat side faces of the cutters intersect the side faces of the cutter teeth at acute angles at diagonally opposite corners 8 of each tooth and intersect the opposite side faces of the cutter teeth at obtuse angles at the diagonally opposite corners 9 of each tooth. A shown in Figs. 3 and 5 the successive cutters 4 of the assembly are offset angularly with respect to each other sufficiently to bring corresponding acute angled edges 8 into axial alinement. An angular movement of the gear within the cutters in one direction will bring the gear teeth into engagement with the acute angled cutting edges on opposite sides of the cutting teeth as shown in Figs. 3 and 5.

While the cutter assembly is moving to the left from the full line position to the dotted line position in Fig. 1, the cutters are held in the position shown in Fig. 3 so that the acute angled cutting fledges 8 on one side of the cutter teeth will engage and cut the faces on one side of each of the gear teeth. Upon completion of movement of the cutter to the left the cutters are adjusted to the position shown in Fig. 5 where the opposite acute angled cutting edges 8 are positioned to cut the opposite faces of the gear teeth. The angularity of the cutter teeth with respect to the gear teeth provide cutting clearance and the cutters cut during both the forward and the return stroke. The form of the cutter teeth in a plane perpendicular to the cutting axis is identical with the form of the teeth of the gear to be cut so that the tooth profiles are shaved down to the exact shape of the cutting edges. Since the end faces of each cutter lie in planes perpendicular to the axis of the cutter, the cutters may be sharpened by grinding back the flat faces until the cutter becomes so thin that it no longer possesses the necessary strength for cutting and regardless of the amount of grinding there is no change in the form or height of the cutting edges. The length of the reciprocating stroke is such that the gear remains in mesh with a cutter at each end of the reciprocating stroke so that the cutter may be positioned for the return stroke by merely imparting sufficient angular movement to the gear or cutter to bring the opposite faces of the gear into engagement with the cutter. A yielding torsional pressure is exerted on the gear or cutter during relative movement in each direction to maintain the cutting edges of the cutter teeth in engagement with the gear teeth and the direction of the torsional pressure is reversed at each end of the reciprocating stroke. The thickness of the cutter teeth being known and the width of the recesses to be cut in a gear being known, it is only necessary, in order to cut the teeth of the gear to correct size, to limit the relative angular movement of the cutter to a predetermined amount by means of suitable stops associated with the cutter or gear support. During cutting the cutter or gear is oscillated through a smaller angle than permitted by the stops. When the angular movement at the ends of the stroke is sufficient to bring the stop elements into engagement the cutting ceases, since the cutting edges no longer press against the gear tooth faces.

Figure 6:
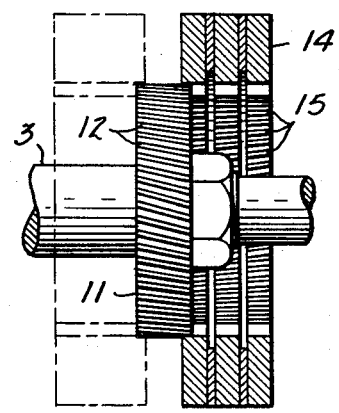
Fig. 6 is a sectional view similar to Fig. 1 showing the cutters acting upon a helical gear.
Figure 4:
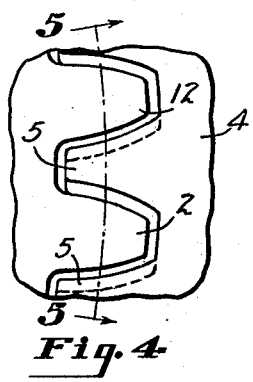
Fig. 4 is a fragmentary end view similar to Fig. 2 showing the position of the cutter teeth during the return movement of the cutters.
Figure 7:
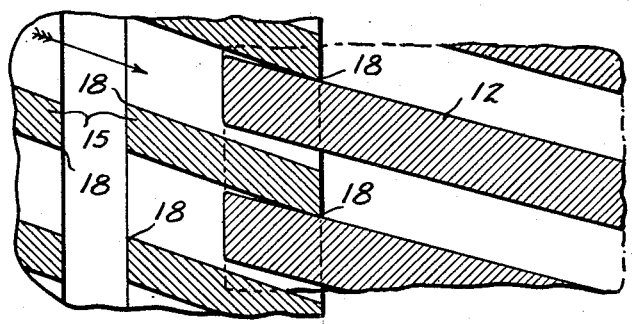
Fig. 7 is a tangential section showing the engagement of the cutter teeth with the side faces of the helical gear teeth.

In Fig. 6 of the drawings there is shown a helical gear 11 having angular teeth 12 and an assembly of cutters 14 having helical teeth 15. As shown in Fig. 7, the teeth 15 have a helix angle slightly greater than the helix angle of the gear teeth 12 and the acute angled cutting edges 18 which engage the gear teeth during the reciprocating movement. The corresponding acute angled cutting edges 18 of successive cutters are aligned on helices of less angle than the helices of the cutter teeth, so that the corresponding cutting edges 18 shown have cutting engagement with the gear tooth faces during the relative axial movement.

The method of cutting a helical gear is the same as upon the spur gear above described except that an angular movement must be imparted to the cutter or gear at a rate proportional to the axial movement to maintain the cutters in engagement with the helical gear tooth faces during a relative axial movement.

The obtuse cutting edges lie within the helices upon which acute angled cutting edges are alined so that they are never brought into engagement with the gear tooth faces. In the case of a spur gear the gear teeth have a zero helix angle, and it is to be understood that the term "helix angle" as used herein is intended to refer to the zero helix angle of the spur gear as well as to helical teeth. In cutting spur gears the acute angled cutting edges of successive cutters are axially alined, i. e., at a zero helix angle as shown in Fig. 3. In cutting helical gears the acute angled cutting edges of successive cutters are alined along a helix angle corresponding to the helix angle of the gear teeth. In both cases the acute angled cutting edges of successive cutters are alined on helices of less angle than that of the cutter teeth and the obtuse angled edges of the teeth are offset inwardly with respect to the acute angled cutting edges so that they do not contact with the work.

Figure 8:
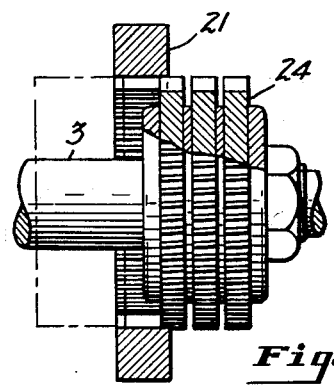
Fig. 8 is a sectional view similar to Figs. 1 and 6 showing an assembly of cutters in the form of external gears disposed in cutting relation with respect to an internal gear.

In Fig. 8 of the drawings the gear being cut is an internal gear 21 and the cutter assembly consists of a plurality of cutters in the form of a plurality of helical gears attached to the spindle 3. The cutting action in this case is just the same as described in connection with Figs. 1 and 6 except that the teeth being cut are internal teeth and the cutter teeth are external teeth.

The method of the present invention enables gear tooth profiles to be cut very rapidly because of the fact that all of the cutter teeth engage simultaneously with all of the gear teeth, and because of the fact that a cut is taken during the return stroke as well as during the forward stroke of the cutter with respect to the work.

Figs. 9 to 13 of the drawings show a machine which may be employed for cutting gears by the method above described.

As shown in Fig. 9, the machine has a bed 30 upon which is mounted a longitudinally movable slide 31 bearing a headstock and a tailstock 33. A spindle 34 journalled in the headstock 32 extends parallel with the direction of movement of the slide and moves with the headstock during reciprocation of the slide. An arbor 35 may be clamped between the spindle 34 and the tailstock 33 and serves to support an external gear being cut or an external cutter for cutting an internal gear. A support 36 for an internal gear or an internal cutter is fixed to the bed 30 between the headstock and tailstock and has an aperture 38 through which the arbor 35 extends and in which is mounted an annular holder 39. The holder 39 is rigidly secured to the support 36 by means of bolts 40 and an assembly of internally toothed cutters or an internal gear may be secured in the holder 39 by means of bolts 41. The slide 31 may be reciprocated on the bed by means of a cylinder 42 mounted in the headstock and provided with a piston 43 which is connected through its rod 44 to a standard 45 fixed to the bed at one end thereof, an adjusting nut 46 being provided in the connection between the piston rod and standard to permit adjustment of the stroke of the slide.

The spindle 34 carries a spline 47 which slides in a spline guide 48 which is journalled in and held against longitudinal movement with respect to the standard 45.

Angular movements of the spline guide in the standard 45 are controlled by a sleeve 49 to which are attached spring clamping arms 50 which embrace the spline guide 48. The arms 50 are attached at one end to the sleeve 49, have intermediate portions which conform to opposite sides of the sleeve 49 and projecting ends 51 which are normally held apart to release the spline guide by a spring 52. The arms 50 are clamped upon the spline guide by means of a pin 53 actuated by a lever 54 attached to the piston 55 of a cylinder 56. When pressure is supplied to the cylinder 56 the lower ends 51 of the clamping arms are drawn together, clamping the spline guide against rotative movement with respect to the sleeve 49. The sleeve 49 has a downwardly extending arm 57 to which is attached a link 58 connected to a piston 59 of an air cylinder 60. The cylinder 60 is a double acting cylinder adapted to positively impart movement to the arm 57 in either direction to impart an angular movement to the sleeve 49 and to the spline guide 48 clamped to the sleeve and, through the spline guide 48 to the spindle 34.

During operation of the machine the gear or cutter carried by the arbor 35 clamped to the spindle 34 is turned by cylinder 60 to bring its teeth into engagement with the teeth of the cutter or gear mounted in the holder 39. The maximum angular movement which may be imparted to the spindle by cylinder 60 is controlled by a pair of stop screws 61 and 62 located on opposite sides of the lever 57 which may be adjusted to accurately gauge the extent of the maximum angular movement. In order to initially center the arm 57 with respect to the stop screws the lower end of the arm is provided with a V-notch 63 which is adapted to be engaged with the upper V-shaped end of a pin 64 slidably mounted in the frame and actuated by a lever 65.

The clamping cylinder 56 is controlled by a manually operated valve 66 which may be operated to release the clamp, while an arbor 35 is being removed and the same or another arbor is secured in place, so that the gear may be properly positioned with respect to the cutters before the machine is started into operation. The slide reciprocating cylinder 42 is controlled by a reversing valve 67 which is operated by a control lever 68 which is engaged by stops 69 and 70 on the slide 31 to reverse the pressure connections to the cylinder at each end of the stroke of the slide. The spindle oscillating cylinder 60 is controlled by a reversing valve 71 which is connected to a lever 72 which is actuated by stops 73 and 74 on the slide 31. The lever 72 is shifted at each end of the stroke of the slide to reverse the pressure connections to the cylinder 60 to thereby reverse the direction in which pressure is exerted on the arm 57 and the direction of the torsional thrust applied to the spindle. To start and stop the machine the fluid pressure supply may be cut off by a suitable valve (not shown).

In the operation of the machine a gear or cutter is fixed to the arbor 35 and an internal gear or an internal cutter is mounted in the holder 39. The teeth of the gear to be cut are centered in the spaces between the cutter teeth. The lever 57 is adjusted to its center position by means of the pin 64, and the screws 61 and 62 are adjusted to permit the spindle the exact amount of angular play which the cutter would have with respect to the finished gear. The valve 66 is then operated to clamp the sleeve 49 to the spline guide 48. Pressure is then admitted to the cylinders 42 and 60. The cylinder 42 imparts an axial movement to the slide 31, spindle 34 and arbor 35, and cylinder 60 applies a torsional thrust to the spindle 34 so that the teeth of the cutter are torsionally pressed with a yielding pressure against the teeth of the gear being cut. At the end of the stroke the pressure connections through the cylinders 42 and 60 are automatically reversed so that the direction of movement of the cutter is reversed and the cutter is pressed against the opposite faces of the gear teeth during return movement and the opposite edges of the cutter cut the opposite faces of the gear teeth. The cutting continues until the arm 57 is brought by the cylinder 60 into engagement with the stops 61 and 62 at each end of the cutting stroke at which time the cutting of the gear is completed.

It is preferred to employ a cutter of a form complemental to the gear to be cut so that all of the gear teeth may be acted upon simultaneously by the cutter, by reason of the simplicity of the mechanism required, and also by reason of the greater speed of cutting. It is to be understood, however, that the principles of the present invention are readily applicable to various gear cutting operations in which a gear shaped cutter is employed and to cutting upon the generating principle as well as upon the formed tooth principle. In either case a single cutter or an assembly of two or more of the cutters herein disclosed may be employed.

For example, as shown in Fig. 14, an external gear 81 mounted on a spindle 83, may be cut with a cutter assembly consisting of a series of cutters 84 in the form of external gears mounted upon a cutter spindle 85, the cutter assembly being similar to that shown in Fig. 8 and the gear 81 having intermeshing engagement with the teeth of the cutter assembly. The spindles 83 and 85 may be the gear and cutter spindles of any standard gear shaper machine. Adjustments commonly provided on gear shaper machines will enable the relative angular positions of the cutter and gear to be shifted to bring the cutter teeth first into engagement with the face of the gear teeth on one side thereof and then into engagement with the opposite faces of the gear teeth. If desired the cutter may be operated in the usual way to finish the faces of the teeth on one side prior to relatively shifting the cutter with respect to the gear to operate upon the opposite faces of the teeth. The cutters rotating in running mesh with the gear cut the gear tooth faces to the correct form upon the generating principle of operation, as is done with ordinary gear shaper cutters.

In operating the cutter of the present invention on the generating principle of operation, the helically alined acute angled cutting edges are elements of the teeth of an imaginary gear conjugate to the gear being cut and running in mesh therewith. The adjustment of the cutters in the assembly for the cutting of internal or external helical or spur gears or worms and worm gears in standard gear generating machines will be readily understood by those skilled in the art.

It will be apparent that the present invention provides a method of cutting gear teeth profiles which enables the gears to be very rapidly and accurately cut, and that the necessary operations can be performed with very simple machinery. It will also be apparent that the method of the present invention permits the use of cutters of a simple form which can be manufactured at a relatively low cost, which are easily sharpened and which maintain cutting edges of identical height and form throughout the life of the cutter.

Furthermore, it is to be understood that the particular form of apparatus shown and described, and the particular procedure set forth, are presented for purposes of explanation and illustration and that various modifications of said apparatus and procedure can be made without departing from my invention as defined in the appended claim.

What I claim is:

In a machine for finishing gears, a frame, a spindle mounted on the frame for axial and angular movements and adapted to support a member in the form of an external gear, a holder carried by the frame having an aperture axially alined with the spindle and adapted to support a member in the form of an internal gear, one of said members being a gear and the other a gear shaped cutter, a spline guide for the spindle journaled in the frame and held against lengthwise movements, means for reciprocating the spindle axially, means operatively connected to the spline guide for applying a torsional thrust to said spline guide during axial movements of the spindle to yieldingly press the teeth of the tool against the gear tooth faces, means associated with said thrust applying means for reversing the direction of thrust, and adjustable means for limiting the extent of angular movement of the spline guide in each direction to confine the action of each profile forming tooth to a space of predetermined width.

MAURICE A. LAMBRIX.